US012591857B2

(12) United States Patent
Barbieri et al.

(10) Patent No.: US 12,591,857 B2
(45) Date of Patent: Mar. 31, 2026

(54) MAINTENANCE HISTORY VISUALIZER TO FACILITATE SOLVING INTERMITTENT PROBLEMS

(71) Applicant: KONINKLIJKE PHILIPS N.V., Eindhoven (NL)

(72) Inventors: Mauro Barbieri, Eindhoven (NL); Johannes Henricus Maria Korst, Eindhoven (NL); Serverius Petrus Paulus Pronk, Vught (NL); Marc Andre Peters, Veldhoven (NL); Qi Gao, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 726 days.

(21) Appl. No.: 17/616,232

(22) PCT Filed: Jun. 18, 2020

(86) PCT No.: PCT/EP2020/066903
§ 371 (c)(1),
(2) Date: Dec. 3, 2021

(87) PCT Pub. No.: WO2020/260121
PCT Pub. Date: Dec. 30, 2020

(65) Prior Publication Data
US 2022/0309474 A1    Sep. 29, 2022

Related U.S. Application Data

(60) Provisional application No. 62/868,114, filed on Jun. 28, 2019.

(51) Int. Cl.
*G06Q 10/20*        (2023.01)
*G06F 3/04847*      (2022.01)
(Continued)

(52) U.S. Cl.
CPC ......... *G06Q 10/20* (2013.01); *G06F 16/2425* (2019.01); *G06F 16/2468* (2019.01); *G06F 16/248* (2019.01); *G06F 3/04847* (2013.01)

(58) Field of Classification Search
None
See application file for complete search history.

(56) References Cited

U.S. PATENT DOCUMENTS

| | | | | | |
|---|---|---|---|---|---|
| 8,862,393 | B2* | 10/2014 | Zhou | ...................... | G08C 17/02 |
| | | | | | 340/506 |
| 9,392,022 | B2* | 7/2016 | Frascadore | ........... | G06F 21/577 |
| 9,823,818 | B1 | 11/2017 | Paul | | |
| 2008/0056071 | A1 | 3/2008 | Burtner | | |

(Continued)

FOREIGN PATENT DOCUMENTS

WO        2018/013666        1/2018

OTHER PUBLICATIONS

International Search Report and Written Opinion Dated Aug. 11, 2020 for International Application No. PCT/EP2020/066903 Filed Jun. 18, 2020.

*Primary Examiner* — Dawaune A Conyers

(57) ABSTRACT
A non-transitory computer readable medium (107, 127) stores instructions readable and executable by at least one electronic processor (101, 113) operatively connected with a display (105) and at least one user input device (103) to perform a device service support method (200). The method includes: identifying attribute values (120) for attributes (122) of a plurality of previous service cases (124) from a service log (130); identifying a set of relevant service cases (128) from the plurality of previous service cases by comparing the identified attribute values for the previous service cases with attribute values for a current service case (126) using a comparison metric (132) and a relevance threshold (134); plotting, on the display, a timeline (150) of relevant service cases (140) of the set of relevant service cases as a function of calendar dates of the relevant service cases;

(Continued)

105

166
164
152
154

150

160
relevance slider
software updates:
replaced parts:
planned mainenance cases:
corrective mainenance cases:
168
168
162
current case providing a relevance graphical user interface (GUI) dialog (160) for user adjustment of the relevance threshold via the at least one user input device; and responsive to user adjustment of the relevance threshold via the relevance GUI dialog, repeating the identifying and plotting to dynamically update the plotted timeline on the bases of the user adjustment of the relevance threshold.

20 Claims, 4 Drawing Sheets

(51) Int. Cl.
G06F 16/242 (2019.01)
G06F 16/2458 (2019.01)
G06F 16/248 (2019.01)

(56) References Cited

U.S. PATENT DOCUMENTS

| | | | |
|---|---|---|---|
| 2009/0024911 A1 | 1/2009 | Margolis | |
| 2010/0234718 A1* | 9/2010 | Sampath | G16H 40/67 |
| | | | 600/407 |
| 2013/0097183 A1 | 4/2013 | Mccracken | |
| 2013/0268890 A1* | 10/2013 | Jensen | G06Q 10/20 |
| | | | 715/810 |
| 2015/0143182 A1* | 5/2015 | Rajamanickam | G06F 11/0781 |
| | | | 714/48 |
| 2016/0294951 A1* | 10/2016 | Durrant | H04L 41/22 |
| 2016/0371489 A1 | 12/2016 | Puri | |
| 2017/0075744 A1* | 3/2017 | Deshpande | H04L 41/0631 |
| 2017/0169342 A1 | 6/2017 | Waltinger | |
| 2017/0276573 A1* | 9/2017 | Radkiewicz | G06N 5/04 |
| 2018/0024901 A1* | 1/2018 | Tankersley | G06Q 10/06393 |
| | | | 707/694 |
| 2019/0244707 A1* | 8/2019 | Becker | H04L 67/52 |
| 2019/0354422 A1* | 11/2019 | Xu | H04L 41/069 |

* cited by examiner

100

105

150

166

164

152

154

MAINTENANCE HISTORY VISUALIZER TO FACILITATE SOLVING INTERMITTENT PROBLEMS

CROSS REFERENCE TO RELATED APPLICATIONS

This application is the U.S. National Phase application under 35 U.S.C. § 371 of International Application No. PCT/EP2020/066903 filed Jun. 18, 2020, which claims the benefit of U.S. Provisional Patent Application No. 62/868, 114 filed Jun. 18, 2019. These applications are hereby incorporated by reference herein.

FIELD

The following relates generally to the servicing and maintenance arts, especially as directed to medical imaging device servicing or the servicing of other complex systems, maintenance history analysis arts, and related arts.

BACKGROUND

The maintenance of medical imaging systems (e.g., magnetic resonance (MR), positron emission tomography (PET), computed tomography (CT), interventional-X ray, etc.) is preferably proactive, rather than being reactive to unexpected failures. This can partly be realized by preventively replacing system parts that are statistically likely to fail in the near future. However, a certain fraction of failures cannot be predicted. These issues can only be solved by corrective maintenance: once the issue is discovered by active monitoring or reported by the customer, it should be solved as quickly as possible to reduce the unplanned downtime of these systems to a minimum. Preferably, the issue should be solved remotely, without needing a service engineer (SE, also referred to herein as a field SE (FSE), or a remote SE (RSE)) to visit the customer site (i.e. hospital). However, if a part has to be replaced, or if remote diagnosis is unsuccessful, then an on-site visit of a SE is usually necessary.

Possibly, the most difficult issues to solve are the so-called intermittent issues. The symptoms of these issues may occur sporadically, often at (apparently) unpredictable intervals. An intermittent problem typically does not lead to a complete system failure, but may cause a temporary reduced availability of some of its functionality. An intermittent issue may be visible at some point in time, while at a later point in time, the issue seems to have disappeared, only to re-emerge repeatedly again later at unexpected times, the next time possibly only next week or next month. The difficulty of intermittent issues is that they may not be visible remotely and that they may not be visible when a SE is visiting the hospital to diagnose the intermittent problem.

To diagnose an intermittent problem, review of the maintenance history may be useful. The maintenance history includes records of previous service cases (both scheduled, e.g. routine or preventative maintenance, and unscheduled servicing performed in response to specific problems) and also ancillary information such as customer complaints, parts replacements, and software upgrades, as well as the types of examinations that have been performed by the system in recent history. Each of these events is usually associated to a timestamp in the history of the system (e.g., a service case may have an "open" date and a "closed" date indicating when the maintenance matter was opened and when it was deemed to be resolved, respectively). In the case of medical imaging systems (as well as other complex systems such as commercial aircraft), an electronic service log is typically maintained for each system, with information contained in the service log being generated automatically and/or manually (e.g. by a SE entering a service report in freeform text, using a structured service report form, or a combination of these). Ancillary information such as time-stamped records of pushed software upgrades may be stored in the service log, and/or may be stored in a different machine log.

The following discloses certain improvements to overcome these problems and others.

SUMMARY

In one aspect, a non-transitory computer readable medium stores instructions readable and executable by at least one electronic processor operatively connected with a display and at least one user input device to perform a device service support method. The method includes: identifying attribute values for attributes of a plurality of previous service cases from a service log; identifying a set of relevant service cases from the plurality of previous service cases by comparing the identified attribute values for the previous service cases with attribute values for a current service case using a comparison metric and a relevance threshold; plotting, on the display, a timeline of relevant service cases of the set of relevant service cases as a function of calendar dates of the relevant service cases; providing a relevance graphical user interface (GUI) dialog for user adjustment of the relevance threshold via the at least one user input device; and responsive to user adjustment of the relevance threshold via the relevance GUI dialog, repeating the identifying and plotting to dynamically update the plotted timeline on the basis of the user adjustment of the relevance threshold.

In another aspect, a service device includes a display device; at least one user input device; and at least one electronic processor programmed to: generate a timeline of services cases based on attributes of previous service cases stored in a database as a function of calendar dates of the relevant service cases; display, on the display device, the generated timeline of service cases and a relevance GUI dialog; receive, via the at least one user input device, a selection of the relevance GUI dialog for user adjustment of a relevance threshold; and dynamically update the generated timeline of service cases based on the user adjustment of the relevance GUI dialog.

In another aspect, a device service method includes: identifying attribute values for attributes of a plurality of previous service cases from a service log retrieved from a database; identifying a set of relevant service cases from the plurality of previous service cases by comparing the identified attribute values for the previous service cases with attribute values for a current service case using a comparison metric and a relevance threshold; plotting, on a display device, a timeline of relevant service cases of the set of relevant service cases as a function of calendar dates of the relevant service cases, the timeline including at least (i) a scheduled maintenance timeline of relevant scheduled service cases of the set of relevant service cases as a function of calendar dates of the relevant scheduled service cases, and (ii) an unscheduled maintenance timeline of relevant unscheduled service cases of the set of relevant service cases as a function of calendar dates of the relevant unscheduled service cases, wherein the scheduled maintenance timeline and the unscheduled maintenance timeline have aligned time axes; providing, on the display device, a relevance GUI dialog for user adjustment of the relevance threshold via at least one user input device; and responsive to user adjustment of the relevance threshold via the relevance GUI dialog, repeating the identifying and plotting to dynamically update the plotted timeline on the basis of the user adjustment of the relevance metric.

One advantage resides in providing improved medical imaging device maintenance including cost savings by improved diagnostics, reducing the amount of unused parts, and reducing the number of service trips by a SE.

Another advantage resides in reducing the unnecessary replacement of parts of a medical imaging device.

Another advantage resides in reducing an amount of information for a SE to review to find relevant information for a service call.

Another advantage resides in removing information for a SE that is not relevant to a current service call.

Another advantage resides in providing a user interface for a SE to review information relevant to a service call.

Another advantage resides in providing dynamic feedback with respect to dependent sub-components of a medical imaging device, predicting necessity of carrying certain set of parts there by enhances service workflow as well as reducing system downtime at customer site.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

Figure 1:
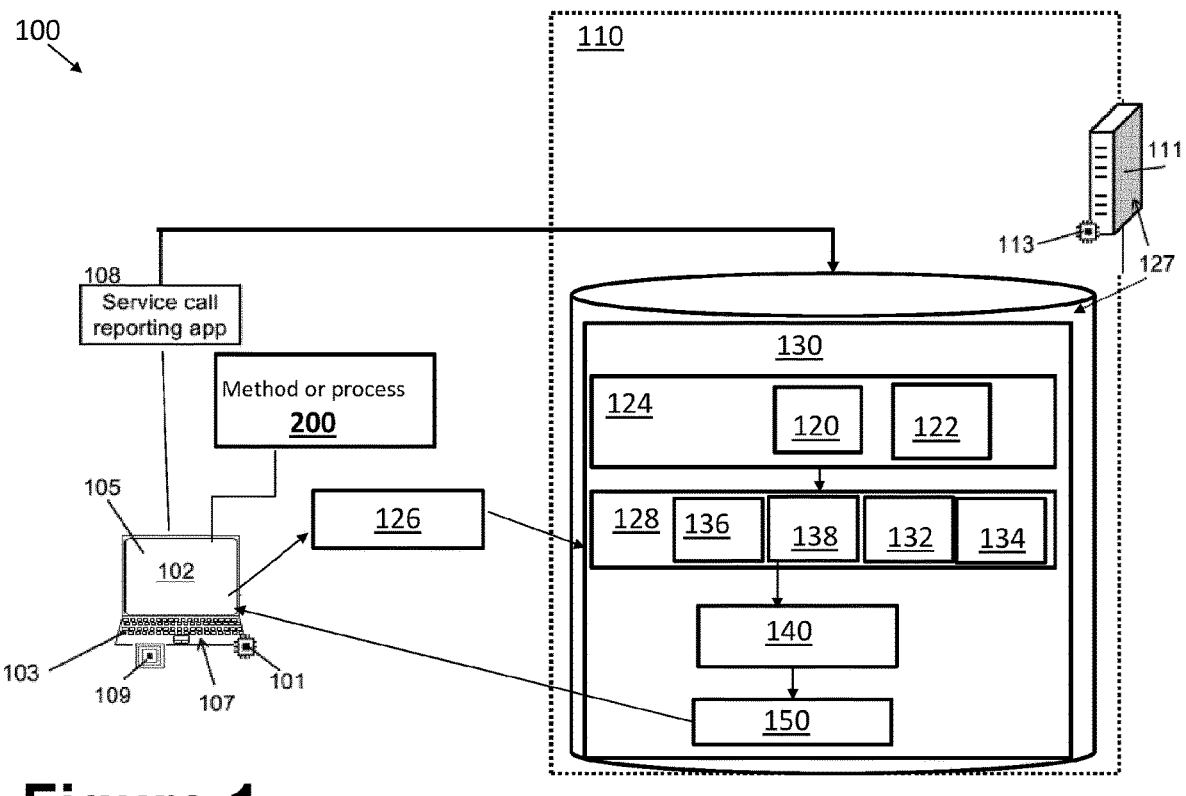
FIG. 1 diagrammatically illustrates an illustrative system for predicting parts-dependencies for replacement of a device in accordance with the present disclosure.

Intermittent problems are particularly difficult to diagnose and fix, because they may not be symptomatic at the time of the current service call. Existing approaches usually involve the FSE accessing the service log to bring up a list of all prior service cases for the medical imaging device and manually sorting through to identify apparently relevant prior service cases. The search may extend to scheduled service cases and possibly also automatically pushed software updates unrelated to specific scheduled or unscheduled service cases.

However, this approach may not be effective for diagnosing an intermittent problem. The root cause of the intermittent problem is not known at the time of the diagnostic process; hence it may not be apparent which past service cases should be reviewed in order to elicit information about the problem. Furthermore, the intermittent nature of the problem means it may have been present, but unrecognized, at the time of a past service case. Hence, the fact that the SE who handled the past service case did not mention the problem does not mean it was not present at the time. Still further, the total quantity of information to be reviewed can be extensive, due to the complexity of a medical imaging device which may include tens of thousands of components interconnected to form variously interacting sub-systems and systems, along with associated software that is frequently updated to accommodate hardware changes, to install security patches, to add new features, to fix identified bugs, and so forth.

In some embodiments disclosed herein, a combination of automated relevance filtering of the unscheduled and scheduled service cases is provided, and a user interface including a displayed timeline of service cases satisfying a user-adjustable relevance threshold. In one example embodiment, the FSE selects case attributes manually using a hierarchical drop-down menu. These attributes are stored as part of the record of each service case (e.g., in the service log), so that the FSE-selected service case attributes for the current service case can be compared with the attributes selected for past service cases by the FSEs who handled those past service cases. In this case, a convenient comparison metric is to compare graphs (e.g., rooted trees) rooted trees representing the user selections for elements of the drop-down menu. (In other words, the graph topology matches the hierarchical menu topology, and nodes of the rooted tree correspond to user-entered menu selections).

In other embodiments disclosed herein, the service log is mined to extract attributes. The attributes will have various data types (text, integer, floating point, logical values, et cetera) and attributes of each data type are arranged into a feature vector. A comparison metric for each feature vector is generated, which are then combined to generate an overall comparison metric indicative of relevance of the prior case to the current case. Other approaches could be used, e.g. some combination of these two approaches.

The relevance metric is contemplated to be used to determine relevance of both scheduled and unscheduled service cases. The relevance of replacement parts is set equal to the relevance of the service case in which the part was replaced. This can also be the case for software updates performed as part of a service case.

On the other hand, software updates may be pushed over the Internet and/or a local area network without being associated with any particular service case—in this situation the pushed software update is either graded as to relevance using a software-specific relevance metric (for example, all software updates pertaining the sub-system exhibiting the intermittent problem are relevant) or there is no relevance grading and all software updates are shown.

The generated timeline displays cases chronologically, which is particularly useful for diagnosing intermittent problems. A "relevance" slider or the like is provided by which the user can adjust the relevance threshold selecting which cases to plot on the timeline (alternatively, all cases may be plotted but with the relevant cases highlighted in red or such). In illustrative embodiments, separate parallel timelines plot the scheduled cases, unscheduled cases, parts replacements, and software updates. By clicking on a particular service case, a pop-up window with additional details may be presented (and/or hovering the mouse over a case can bring up a smaller contextual pop-up bubble or so forth).

While especially useful for cases intermittent problems, the disclosed approaches can be used to more efficiently sort through past service cases in the context of any current service call. As disclosed herein, the approaches are used for servicing support for medical imaging devices, but could also be applicable to servicing of patient monitoring installations, and to servicing of complex systems generally, such as for commercial airliner servicing.

With reference to FIG. 1, an illustrative servicing support system 100 for supporting a service engineer in servicing a device (e.g., a medical imaging device, not shown—also referred to as a medical device, an imaging device, imaging scanner, and variants thereof) is diagrammatically shown. By way of some non-limiting illustrative examples, the medical imaging device under service may be a magnetic resonance imaging (MRI) scanner, a computed tomography (CT) scanner, a positron emission tomography (PET) scanner, a gamma camera for performing single photon emission computed tomography (SPECT), an interventional radiology (IR) device, or so forth. As shown in FIG. 1, the servicing support system 100 includes a service device 102 carried or accessed by a SE. The service device 102 can be a personal device, such as a mobile computer system such as a laptop or smart device. In other embodiments, the service device 102 may be an imaging system controller or computer integral with or operatively connected with the imaging device undergoing service (e.g., at a medical facility). As another example, the service device 102 may be a portable computer (e.g. notebook computer, tablet computer, or so forth) carried by an SE performing diagnosis of a fault with the imaging device and ordering of parts. In another example, the service device 102 may be the controller computer of the imaging device under service, or a computer based at the hospital. In other embodiments, the service device may be a mobile device such as a cellular telephone (cellphone) or tablet computer and the servicing support system 100 may be embodied as an "app" (application program). The service device 102 allows the service engineer to interact with the servicing support system via at least one user input device 103 such a mouse, keyboard or touchscreen. The service device further includes an electronic processer 101 and non-transitory storage medium 107 (internal components which are diagrammatically indicated in FIG. 1). The non-transitory storage medium 107 stores instructions which are readable and executable by the electronic processor 101 to implement the servicing support system 100. The service device 102 may also include a communication interface 109 such that the servicing support system 100 may communicate with a backend server or processing device 111, which may optionally implement some aspects of the servicing support system 100 (e.g., the server 111 may have greater processing power and therefore be preferable for implementing computationally complex aspects of the servicing support system 100). Such communication interfaces 109 include, for example, a wireless Wi-Fi or 4G interface, a wired Ethernet interface, or the like for connection to the Internet and/or an intranet. Some aspects of the servicing support system 100 may also be implemented by cloud processing or other remote processing.

In illustrative FIG. 1, the servicing information collected using a service call reporting app 108 is fed to a database backend 110 (e.g., implemented at a medical facility or other remote center from where the SE is performing the service call, or at the imaging device vendor or other servicing contractor). For example, the database backend 110 may implement a service log for the medical imaging device. The backend processing is performed on the backend server 111 equipped with an electronic processor 113 (diagrammatically indicated internal component). The server 111 is equipped with non-transitory storage medium 127 (internal components which are diagrammatically indicated in FIG. 1). While a single server computer is shown, it will be appreciated that the backend 110 may more generally be implemented on a single server computer, or a server cluster, or a cloud computing resource comprising ad hoc-interconnected server computers, or so forth.

The non-transitory storage medium 127 stores instructions executable by the electronic processor 113 of the backend server 111 to perform a device service support method or process 200 implemented by the servicing support system 100. In some examples, the method 200 may be performed at least in part by cloud processing.

Figure 2:
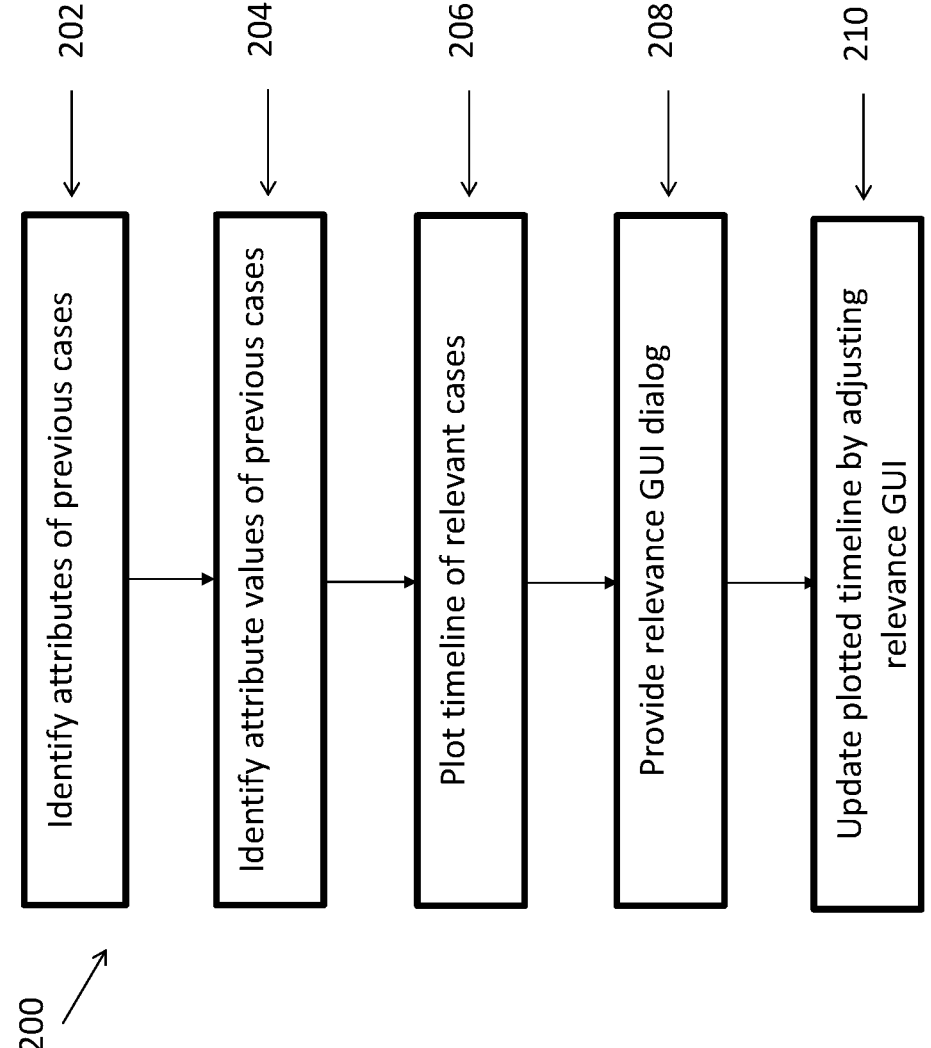
FIG. 2 shows exemplary flow chart operations of the system of FIG. 1.

With reference to FIG. 2, and with continuing reference to FIGS. 3-5 an illustrative embodiment of an instance of the device service support method 200 executable by the electronic processor 113 is diagrammatically shown as a flowchart.

At an operation 202, attribute values 120 for attributes 122 of a plurality of previous service cases 124 for a device (e.g., an imaging device) are identified from a service log 130 retrieved from a database (e.g., the non-transitory storage medium 127). An attribute can refer to a property of maintenance of the imaging device, and includes a corresponding value. For example, an attribute can be "calibration performed?" with the corresponding value being either "yes" or "no". In another example, the attribute can be "part <x> replaced?" with the value again being "yes" or "no". In a further example, the attribute might be a measurement (e.g., x-ray tube voltage) and the corresponding value would be a kV value (or perhaps <null> if the tube voltage was not measured in a prior service case). These can be stored as (attribute:value) pairs in the non-transitory computer readable medium 127.

At an operation 204, a set of relevant service cases 128 is identified from the retrieved previous service cases 124. To do so, the attribute values 120 for the previous service cases 124 identified at 202 are compared to attribute values for a current service case 126 using a comparison metric 132 and a relevance threshold 134.

In one example embodiment including operations 202 and 204, the electronic processor 113 is programmed to perform operation 202 by mining the service log 130 to extract the attribute values 120 for the previous service cases 124. The comparison operation 204 then includes, for each of a plurality of different data types (e.g., two or more of text, integer, floating point, and logical values), constructing feature vectors 136 storing the attribute values 120 for attributes 122 of that data type of the current service case 126 and the respective previous service cases 124. Values are computed for a vector comparison metric 138 that compares the feature vectors 136 representing the attribute values 120 for the attributes 122 of that data type of the respective previous service cases 124 with the feature vector representing the attribute values for the attributes of that data type of the current service case 126. The values of the feature vectors 136 are combined (i.e., summed) for the plurality of different data types to determine the set of relevant service cases 128. In this manner, the set of attributes 122 defines the dimension of the feature vector in this embodiment (so if there are N attributes then the feature vector has length N, with each vector element storing the value of the corresponding attribute).

At an operation 206, a timeline 150 of relevant service cases 140 of the set of relevance service cases 128 is plotted on the display device 105. The timeline 150 represents a function of calendar dates of the relevant service cases. The calendar dates can include, for example, open service dates, close service dates, and include a bar running from the open date to the close date.

In some embodiments, the plotting operation 206 can include plotting additional timelines. In one example, a scheduled maintenance timeline 152 of relevant scheduled service cases of the set of relevant service cases 128 as a function of calendar dates of the relevant scheduled service cases is plotted on the display device 105. In another example, an unscheduled maintenance timeline 154 of relevant unscheduled service cases of the set of relevant service cases 128 as a function of calendar dates of the relevant unscheduled service cases is plotted on the display device 105. In examples where both the timelines 152 and 154 are plotted, these timelines have aligned time axes as shown on the display device 105.

At an operation 208, a relevance graphical user interface (GUI) dialog 160 is provided on the display device 105. The relevance GUI dialog 160 allows for user adjustment of the relevance threshold via the at least one user input device 103. As described in more detail with reference to FIGS. 3A and 3B, the relevance GUI dialog 160 can comprise a slider bar movable with a mouse 103.

At an operation 210, responsive to user adjustment of the relevance threshold via the relevance GUI dialog 160 (e.g., moving the slider bar with the mouse 103), the identifying operation 204 and the plotting 206 operation are repeated to dynamically update the plotted timeline 150 on the basis of the user adjustment of the relevance threshold 134.

In one example embodiment, a current service case description GUI dialog 162 can also be displayed on the display device 105. The current service case description GUI dialog 162 is for constrained user input of the attribute values 122 for the current service case 126. For example, the current service case description GUI dialog 162 can comprise drop-down lists or list boxes which list the possible values for an attribute 122. Another example is a typed entry, for example a numerical value entry dialog that is limited to a single floating-point value, or to an integer value, or so forth. It will be appreciated that the drop-down lists define a finite set of attributes 122, which simplifies comparison of cases. In some embodiments, the drop-down lists of the GUI dialog 162 are constructed hierarchically, so that the user is guided as to what attributes to provide. For example, a top-level (or upper level) of the hierarchy may specify the system being serviced (e.g., patient table, X-ray tube assembly, X-ray detector, et cetera), and based on this selection subsequent levels lower in the hierarchy are selected (e.g., selection of "X-ray tube assembly" as the attribute value for the "system being serviced" attribute may bring up lower level selections such as x-ray tube measurements and so forth; whereas selection of the "patient table" as the attribute value may bring up lower level selections directed to the patient table system; and so forth). This same GUI dialog 162 is provided for each service case, and the inputted (attribute:value) pairs for past service cases are stored in the service log 110. In this embodiment, then, the operation 202 identifies the attribute values by retrieving these user-inputted values from the service log 110. The operation 204 can then use a comparison metric constructed as a graph (such as rooted tree) comparison metric, where the graph representing each service case has nodes in which each node is an (attribute:value) pair inputted by the SE, and the graph has links corresponding to the links of the hierarchy of the GUI dialog 162. Since the same hierarchical GUI dialog 162 is used by each SE for inputting attribute values for each case, the graphs representing the attribute values for the past and current service cases inherently have the same underlying graph structure (though different attribute nodes will generally have been entered for each case). Advantageously, a rooted tree can have a direct correspondence with the drop-down list GUI dialog 162 from which it is derived.

Responsive to constrained user input of one or more attribute values 120 for the current service case 126, the identifying operation 204 and the plotting operation 206 are repeated to dynamically update the plotted timeline 150 on the basis of the user input of the one or more attribute values for the current service case. In this embodiment, the comparing includes comparing a series of directed graphs. For example, a first directed graph is constructed representing the attribute values 120 for the current service case 126 as nodes of the directed graph. A second directed graph is constructed representing the attribute values 122 for the respective previous service cases 124 as nodes of the respective directed graphs. The respective directed graphs are compared such that the attribute values of the respective previous service cases are compared with the directed graph representing the attribute values of the current case using a graph comparison metric. In some examples, the respective directed graphs of the current case 126 and the previous service cases 124 can be analyzed or compared with directed graphs for other devices having similar directed graph using the comparison metric 132 and the relevance threshold 134. An intermittent issue of a device of the current case 126 can be determined based on this analyzing or comparison.

In other embodiments, other information for the imaging device can be extracted from the service log 130. In one example, timestamped records of part replacements for the imaging device are extracted from the service log 130 by associating each replacement part with a previous service case 124 based on its replacement timestamp falling between the opening and closing dates of the previous service case 124 (or by some other basis for association such as the service record for the previous service case 124 containing an explicit indication that the part was replaced during that service call). In this example, the plotting operation 206 further includes plotting representations 164 of the replacement parts associated with the plotted relevant service cases. In another example, software updates for the imaging device are extracted from the service log 130. In this example, the plotting operation 206 includes plotting a timeline 166 of the software updates as a function of calendar dates of the software updates. The timeline of relevant service cases and the timeline of software updates have aligned time axes. Software updates are often pushed automatically, and hence may not be associated with any previous service call. Furthermore, software updates can sometimes encompass a number of different systems or have other broad impact. Accordingly, in some embodiments, all software updates are plotted, without regard to any relevance assessment.

Figure 3A:
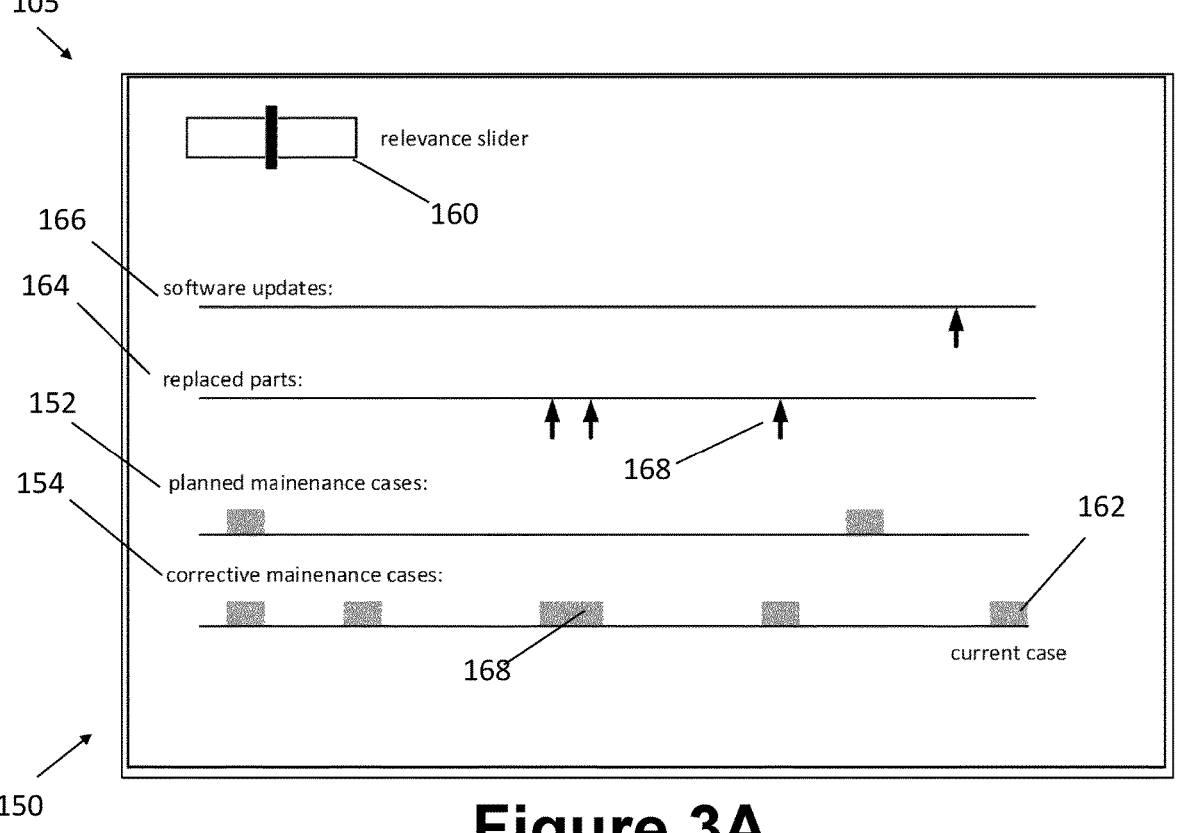
FIGS. 3A and 3B show examples of a graphical user interface (GUI) displayed on the system of FIG. 1.
Figure 3B:
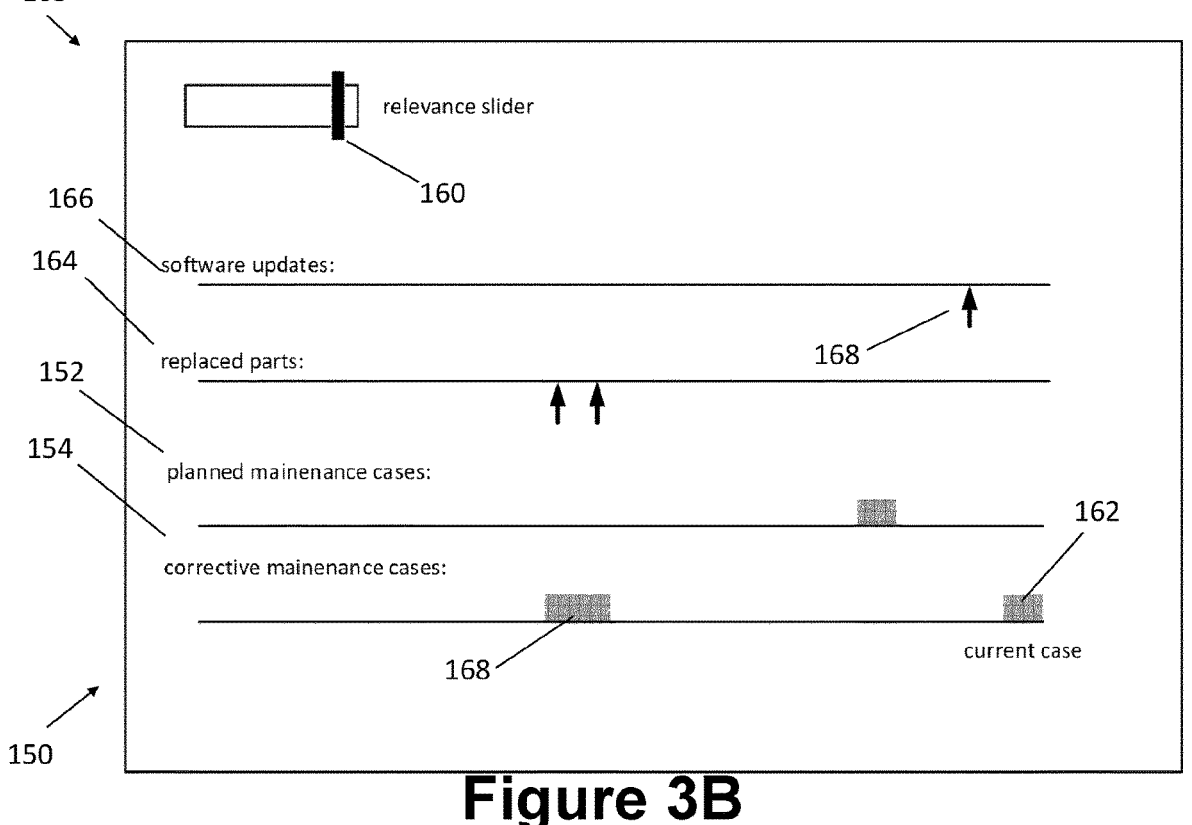

FIGS. 3A and 3B show an example of the information displayed on the display device 105. Referring to FIG. 3A, the display device 105 shows the relevance GUI dialog 160 as a slider bar movable with the mouse 103. The timeline 150 of relevant service cases 140 is also displayed, along with the scheduled maintenance timeline 152, the unscheduled maintenance timeline 154, the representations 164 of the replacement parts, and the timeline 166 of the software updates. The various timelines 150, 152, 164, 166 have aligned horizontal (time) axes, so that a vertical line crossing the four timelines corresponds to a single point in time. Each of these timelines includes symbols (e.g., boxes or arrows) comprising the current service case description GUI dialog 162 (e.g., implemented as drop-down lists or list boxes which list the possible values for an attribute 122 when selected via the user input device 103).

Each of the timelines can include icons 168 representing previous services cases 140. Icons 168 satisfying the comparison threshold can be indicated with color-coding or shading. In addition, upon selection of one of the icons 168, a pop-up window can be displayed which includes information related to the selected icon.

As shown in FIG. 3A, the slider bar is located on a central portion of the relevance GUI dialog 160. Turning to FIG. 3B, the slider bar has been moved (via the user input device 103) to a "right" side of the relevance GUI dialog 160. As a result, each of the displayed timelines includes fewer icons (i.e., the relevance threshold 134 has been increased, which reduces the number of relevant case relative to the relevance threshold). Comparing FIGS. 3A and 3B, the number of relevant cases on the representations 164 of the replacement parts has decreased from 3 relevant cases to 2 relevant cases; the number of relevant cases on the scheduled maintenance timeline 152 has decreased from 2 relevant cases to 1 relevant case; and the number of relevant cases on the timeline 150 of relevant service cases has decreased from 5 relevant cases to 2 relevant cases. The number or pattern of relevant service cases can also then be used to compare relative to other systems to find systems that have the same or similar pattern, which may be used to support the determination of the intermittent issue.

Example

The following discloses an illustrative embodiment of operations 202-210 in more detail. The ranking of the potentially relevant events in the history of a given system can be implemented as follows. A current case c is assumed to be predominantly specified by a SE by selecting one or more items in a hierarchical drop-down menu. These items represent, for example, symptoms observed or reported by a customer (e.g. image quality, error message on the screen, scan abort, etc.), subsystems that may be affected (e.g. monitor, gantry, image-reconstruction server, detector) as well as troubleshooting, testing and maintenance operations performed (e.g. tube calibration, current measurement, connectivity test, etc.). These items are typically organized in hierarchies. For example, an item about image quality issues can have sub-items about the type of issues (e.g. black screen, low brightness, lack of contrast, artefacts, noise, etc.).

A drop-down menu consists of items that can also be expanded as sub-menus. A SE can repeatedly navigate through the hierarchical drop-down menu by repeatedly expanding/collapsing sub-menus and selecting items. The SE can select "leaf items" (i.e., items that cannot be expanded as submenus), as well as submenu items themselves. Each (sub-)menu can be either single-option or multiple-option. For a single-option menu, at most one of its items can be selected, while for a multiple-option menu, zero, one, or more items can be selected.

The hierarchical drop-down menu can be modelled by a rooted tree G=(V, E, r), where V denotes a set of nodes and E denotes the set of edges (connections). The root r∈V is a specific node, relating to the starting view of the drop-down menu. The set L⊆V denotes the set of leaf nodes, i.e., the nodes that can be selected, but not expanded. By definition, the tree does not contain cycles, i.e., for each node v∈V, there is a unique path from root node r to node v. The unique path from root node r to a leaf node v goes via zero or more intermediate nodes that correspond to sub-menus.

After selecting all relevant items in the drop-down menu, the current case can be modelled by the labelled rooted tree G, where each node v E G is labelled with a binary value $s(v)\in\{0,1\}$, with $s(v)=1$ if and only if node v has been selected by the SE. The labelling of current case c is thus specified by mapping $s_c{:}V{\rightarrow}\{0,1\}$. The labelling of a previous case c' is similarly specified by a mapping $s_{c'}{:}\ V{\rightarrow}\{0, 1\}$. Note that the set V can be assumed identical for these mappings, unless the drop-down menu has been extended/changed over time.

The relevance of a previous case c' in comparison to the current case c can now be determined by using a distance metric between mappings $s_c$ and $s_{c'}$. A straightforward approach could be to assume that both cases have the same rooted tree and that the same set of vertices for both mappings are identically ordered, so that both mappings can be considered as binary strings of length |V|. Now, the distance could be simply defined as the number of positions at which the binary strings differ. Alternatively, one could only take into account the items that are selected in both cases.

In another embodiment, one could specify a distance metric that explicitly takes into account the hierarchy of the tree, such that for example, the distance from a node to the root node is taken into account to weigh the importance of equality of the respective node labels. Furthermore, the distance metric can be refined to take into account whether or not the respective items can be selected from a single-option menu or from a multiple-option menu. Additional elements can be added to quantify the distance between previous cases and a given current case. For example, the time distance could also be added as a term, so that, for example, the relevance of a previous case decreases if the time between this previous case and the current case becomes too large.

An appropriately chosen distance metric can be used to order the given set of previous cases in order of decreasing relevance. In this way, a sub-selection of relevant previous cases can be constructed by including only those previous cases in the timeline for which the relevance exceeds a given threshold T. A user of the smart history visualizer can use a slider, or a similar interaction option, to dynamically adapt the threshold T. In this way, more or fewer previous cases can be displayed. Alternatively, the threshold can be used to set the number of previous cases to show. In that case, one can always show T previous cases (whenever available), allowing previous cases to be added that in itself have a low relevance.

In some examples, the history of an imaging device is modelled as a sequence of events where each event is represented by a vector of features. Each event has a timestamp. The following categories of events are considered and mapped to feature types: previously reported issues (e.g., free text); previously replaced hardware components (e.g., a set of categorical items); a previously replaced software components (e.g., a set of categorical items); errors logged by the system (e.g., a set of categorical items); events such as reboots, etc. (e.g., a set of categorical items); parameter and sensor readings logged by the system (e.g., numerical); system configuration changes (e.g., set of categorical items); tests performed and results (e.g., set of categorical items, and numerical); and calibrations performed and results (e.g., a set of categorical items, and numerical).

A distance measure is defined for each category depending on the type of features and the category itself, including: previously reported issues (e.g., free text implemented as text similarity based on tfidf; previously replaced hardware components (e.g., a set of categorical items implemented as a combination of 0/1 similarity and Jaccard similarity; a previously replaced software components (e.g., set of categorical items implemented as a combination of 0/1 similarity and Jaccard similarity); errors logged by the system (e.g., a set of categorical items implemented as a combination of text similarity based on tfidf for the textual part of the errors and Jaccard similarity for the categorical properties of error events); system events such as reboots, etc. (e.g., a set of categorical items implemented as a combination of text similarity based on tfidf for the textual part of the errors and Jaccard similarity for the categorical properties of error events); parameter and sensor readings logged by the system (e.g., a numerical set implemented as a Euclidean distance between vectors of numerical parameters; and/or a correlation between time-series of sensor readings); a system configuration changes (e.g., a set of categorical items implemented as a Jaccard similarity); tests performed and results (e.g., a set of categorical items implemented as a combination of text similarity based on tfidf for the textual part of the errors and Jaccard similarity for the categorical properties of error events, and/or numerical items a Euclidean distance between vectors of numerical parameters; and/or a correlation between time-series of sensor readings); and calibrations performed and results (e.g., a set of categorical items implemented as a combination of text similarity based on tfidf for the textual part of the errors and Jaccard similarity for the categorical properties of error events, and/or numerical items a Euclidean distance between vectors of numerical parameters; and/or a correlation between time-series of sensor readings).

In this embodiment, the relevance of an event is calculated by combining the nine distance measures above, or a subset of them. The combination can be based on a weighted average or a multiplication.

In addition to showing previous cases, the history could show additional events, such as software updates, previous part replacements, etc. Some of these additional events can be chosen to always be shown, especially if these events are relatively rare and happened recently. For some of these additional events, the relevance can be also determined explicitly. For example, previous part replacements can be linked to subsystems, and symptoms that led to their replacement in the past could be directly linked to the symptoms that appear in the hierarchical drop-down menu. Furthermore, the user can explicitly make these additional events visible or invisible, depending on the occasion and depending on the type of additional event.

A non-transitory storage medium includes any medium for storing or transmitting information in a form readable by a machine (e.g., a computer). For instance, a machine-readable medium includes read only memory ("ROM"), solid state drive (SSD), flash memory, or other electronic storage medium; a hard disk drive, RAID array, or other magnetic disk storage media; an optical disk or other optical storage media; or so forth.

The methods illustrated throughout the specification, may be implemented as instructions stored on a non-transitory storage medium and read and executed by a computer or other electronic processor.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A non-transitory computer readable medium storing instructions readable and executable by at least one electronic processor operatively connected with a display and at least one user input device to perform a medical device service support method, the method comprising:
   identifying attribute values for attributes of a plurality of previous service cases from a service log from the medical device for which service support is sought;
   identifying a set of relevant service cases from the plurality of previous service cases by comparing the identified attribute values from one or more service logs from one or more other medical devices for the previous service cases with attribute values from the service log from the medical device for a current service case using a comparison metric indicative of relevance of the previous service case to the current service case and a relevance threshold;
   plotting, on the display, a timeline of relevant service cases of the set of relevant service cases as a function of calendar dates of the relevant service cases;
   providing a relevance graphical user interface (GUI) dialog for user adjustment of the relevance threshold via the at least one user input device; and
   responsive to user adjustment of the relevance threshold via the relevance GUI dialog, repeating the identifying and plotting to dynamically update the plotted timeline on the basis of the user adjustment of the relevance threshold.

2. The non-transitory computer readable medium according to claim 1, wherein the method further includes:
   providing a current service case description GUI dialog for constrained user input of the attribute values for the current service case; and
   responsive to constrained user input of one or more attribute values for the current service case, repeating the identifying and plotting to dynamically update the plotted timeline on the basis of the user input of the one or more attribute values for the current service case.

3. The non-transitory computer readable medium according to claim 2, wherein the comparing includes:
   constructing a directed graph representing the attribute values for the current service case as nodes of the directed graph;
   constructing directed graphs representing the attribute values for the respective previous service cases as nodes of the respective directed graphs; and
   comparing the respective directed graphs representing the attribute values of the respective previous service cases with the directed graph representing the attribute values of the current case using a graph comparison metric.

4. The non-transitory computer readable medium according to claim 1, wherein the method further includes:
   analyzing the respective directed graphs of the current case and the previous service cases with directed graphs for other devices having similar directed graph using the comparison metric and the relevance threshold;
   determining an intermittent issue of a device of the current case based on the analyzing.

5. The non-transitory computer readable medium according to claim 1, wherein the method further includes:
   mining the service log to extract the attribute values for the previous service cases.

6. The non-transitory computer readable medium according to claim 5, wherein the comparing includes:

for each of a plurality of different data types:

constructing feature vectors storing the attribute values for attributes of that data type of the current service case and the respective previous service cases; and computing values of a vector comparison metric comparing the feature vectors representing the attribute values for the attributes of that data type of the respective previous service cases with the feature vector representing the attribute values for the attributes of that data type of the current case; and combining the values of the vector comparison metrics for the plurality of different data types.

7. The non-transitory computer readable medium of claim 6, wherein the plurality of different data types includes two or more of text, integer, floating point, and logical values.

8. The non-transitory computer readable medium according to claim 1, wherein the plotting includes:

plotting, on the display, a scheduled maintenance timeline of relevant scheduled service cases of the set of relevant service cases as a function of calendar dates of the relevant scheduled service cases; and plotting, on the display, an unscheduled maintenance timeline of relevant unscheduled service cases of the set of relevant service cases as a function of calendar dates of the relevant unscheduled service cases;

wherein the scheduled maintenance timeline and the unscheduled maintenance timeline have aligned time axes.

9. The non-transitory computer readable medium according to claim 1, wherein the method further includes:

extracting replacement parts from the service log including associating each replacement part with a previous service case;

wherein the plotting further includes plotting representations of the replacement parts associated with the plotted relevant service cases.

10. The non-transitory computer readable medium according to claim 1, wherein the method further includes:

extracting software updates from the service log;

wherein the plotting includes plotting a timeline of the software updates on the display as a function of calendar dates of the software updates;

wherein the timeline of relevant service cases and the timeline of software updates have aligned time axes.

11. A service device for assisting in the service of a medical device, comprising:

a display device;

at least one user input device; and at least one electronic processor programmed to:

identifying attribute values for attributes of a plurality of previous service cases from a service log from the medical device for which service support is sought;

identifying a set of relevant service cases from the plurality of previous service cases by comparing the identified attribute values from one or more service logs from one or more other medical devices for the previous service cases with attribute values from the service log from the medical device for a current service case using a comparison metric indicative of relevance of the previous service case to the current service case and a relevance threshold;

generate a timeline of services cases based on attributes of previous service cases stored in a database as a function of calendar dates of the relevant service cases;

display, on the display device, the generated timeline of service cases and a relevance graphical user interface (GUI) dialog;

receive, via the at least one user input device, a selection of the relevance GUI dialog for user adjustment of a relevance threshold between attributes of the current service case and attributes of the previous service cases; and dynamically update the generated timeline of service cases based on the user adjustment of the relevance GUI dialog.

12. The service device according to claim 11, wherein the relevance GUI dialog includes:

a slider bar configured to, upon selection via the at least one user input device, adjust the relevance threshold.

13. The service device according to claim 12, wherein, upon adjustment of the relevance threshold via the slider bar, the timeline is configured to expand or contract as displayed on the display device.

14. The service device according to claim 11, wherein the timeline comprises:

icons indicative of the previous services cases;

wherein the icons satisfying the comparison threshold include color-coding or shading.

15. The service device according to claim 14, wherein upon selection of an icon of the timeline via the at least one user input device, the at least one electronic processor is programmed to:

generate, for display on the display device, a window including information related to the selected icon.

16. The service device according to claim 11, wherein the at least one electronic processor is programmed to:

control the display device to display a scheduled maintenance timeline of relevant scheduled service cases of the set of relevant service cases as a function of calendar dates of the relevant scheduled service cases; and control the display device to display an unscheduled maintenance timeline of relevant unscheduled service cases of the set of relevant service cases as a function of calendar dates of the relevant unscheduled service cases;

wherein the scheduled maintenance timeline and the unscheduled maintenance timeline have aligned time axes.

17. The service device according to claim 16, wherein the at least one electronic processor is programmed to:

control the display device to display representations of replacement parts associated with the plotted relevant service cases.

18. The service device according to claim 16, wherein the at least one electronic processor is programmed to:

control the display device to display software updates as a function of calendar dates of the software updates;

wherein the timeline of relevant service cases and the timeline of software updates have aligned time axes.

19. A medical device service method, comprising:

identifying attribute values for attributes of a plurality of previous service cases from a service log from the medical device for which service support is sought;

identifying a set of relevant service cases from the plurality of previous service cases by comparing the identified attribute values from one or more service logs from one or more other medical devices for the previous service cases with attribute values from the service log from the medical device for a current service case using a comparison metric indicative of relevance of the previous service case to the current service case and a relevance threshold;

extracting replacement parts from the service log including associating each replacement part with a previous service case;

plotting, on a display device, a timeline of relevant service cases of the set of relevant service cases as a function of calendar dates of the relevant service cases, the timeline including at least (i) a scheduled maintenance timeline of relevant scheduled service cases of the set of relevant service cases as a function of calendar dates of the relevant scheduled service cases, and (ii) an unscheduled maintenance timeline of relevant unscheduled service cases of the set of relevant service cases as a function of calendar dates of the relevant unscheduled service cases and (iii) representations of the replacement parts associated with the plotted relevant service cases, wherein the scheduled maintenance timeline and the unscheduled maintenance timeline have aligned time axes;

providing, on the display device, a relevance graphical user interface (GUI) dialog for user adjustment of the relevance threshold via at least one user input device; and responsive to user adjustment of the relevance threshold via the relevance GUI dialog, repeating the identifying and plotting to dynamically update the plotted timeline on the basis of the user adjustment of the relevance metric.

20. The method according to claim 19, further including at least one of:

displaying representations of replacement parts associated with the plotted relevant service cases; or displaying software updates as a function of calendar dates of the software updates, wherein the timeline of relevant service cases and the timeline of software updates have aligned time axes.

* * * * *